United States Patent [19]
Goutzoulis et al.

[11] Patent Number: 5,291,569
[45] Date of Patent: Mar. 1, 1994

[54] FIBEROPTIC DELAY LINE FOR GENERATING REPLICAS OF AN RF SIGNAL WITH VARIABLE REPLICA-TO-REPLICA TIME RESOLUTION

[75] Inventors: Anastasios P. Goutzoulis, Pittsburgh; David K. Davies, Churchill Borough, both of Pa.

[73] Assignee: Westinghouse Electric Corp., Pittsburgh, Pa.

[21] Appl. No.: 880,448

[22] Filed: May 8, 1992

[51] Int. Cl.⁵ .................. G02B 6/00; G02B 6/26; H01J 1/16
[52] U.S. Cl. ...................... 385/39; 359/127; 250/227.12
[58] Field of Search .............. 385/24, 27, 39; 359/115, 127, 195, 173; 250/227.12

[56] References Cited

U.S. PATENT DOCUMENTS

| | | | |
|---|---|---|---|
| 4,028,702 | 6/1977 | Levine | 343/100 |
| 4,128,759 | 12/1978 | Hunt et al. | 250/199 |
| 4,297,656 | 11/1981 | Pan | 331/135 |
| 4,725,844 | 2/1988 | Goodwin et al. | 342/374 |
| 4,856,862 | 8/1989 | Passmore et al. | 385/24 X |
| 4,903,029 | 2/1990 | Newberg et al. | 342/172 |
| 4,959,540 | 9/1990 | Fan et al. | 385/39 X |
| 5,101,455 | 3/1992 | Goutzoulis | 385/24 |
| 5,109,449 | 4/1992 | Newberg et al. | 385/24 X |

*Primary Examiner*—Akm E. Ullam
*Attorney, Agent, or Firm*—Eugene LeDonne

[57] ABSTRACT

A fiberoptic delay line architecture for generating multiple replicas of an input RF signal with variable replica-to-replica time resolution is provided in which the required hardware is kept to a minimum. A series of cascaded binary fiberoptic segment delay lines is used in which each cascaded binary fiberoptic segment delay line has an equal and defined number of segments but variable minimum time resolution. The minimum time resolution of each cascaded binary fiberoptic segment delay line increases by a multiple of two compared to the prior cascaded binary fiberoptic segment delay line. In this manner, the required number of segments and switches increases in a $\log_2 \times \log_2$ relationship as the number of desired replicas and possible replica-to-replica delay values increases.

14 Claims, 2 Drawing Sheets

5,291,569

FIBEROPTIC DELAY LINE FOR GENERATING REPLICAS OF AN RF SIGNAL WITH VARIABLE REPLICA-TO REPLICA TIME RESOLUTION

GOVERNMENT RIGHTS

This invention was made with Government support under Contract F33657-81-C-0115 awarded by the United States Air Force. The Government has certain rights in the invention.

BACKGROUND OF THE INVENTION

1. Field Of The Invention

This invention relates to process signal generators, and, more particularly, to process signal generators for use with radar test devices to produce a substantially delayed replicas of a transmitted radar signal.

2. Description Of Related Art

In various applications, one often faces the need to generate multiple delayed replicas of a radar signal and transmit it back. It is well known that fiberoptic delay lines because of their inherent capability to support very wide bandwidth and large time delays are a good candidate for generating a single delayed version of an input signal. Such an arrangement is shown in U.S. Pat. No. 4,128,759 wherein a plurality of fiberoptic light paths, each having a determinably variant optical propagation delay, are used to generate multiple delayed replicas of a signal. Such a signal generator can be useful to produce delayed replicas of a transmitted radar signal to jam a radar detecting station by overwhelming the station with a plurality of signals.

An example of a prior art fiberoptic delay line is shown in FIG. 1. Therein, prior art fiberoptic delay line 10 receives an input signal 12 which drives a laser diode 14. The optical output of laser diode 14 drives a 1:N fiberoptic splitter 16. The output of fiberoptic splitter 16 is fed into N fiber segments 20 which are of linearly increasing length. The increment of the increasing length corresponds to the minimum delay resolution $T_1$. The transmission of each fiber 20 is controlled by an optical switch 18. The outputs of switches 18 drive an N:1 fiberoptic combiner 22 which sums the optical signals and drives a common detector 24. The output of detector 24 passes through buffer 26 before being transmitted as output signal 28.

In prior art fiberoptic delay line 10, when all N optical switches 18 are "on", the output of detector 24 consists of N signal replicas spaced $T_1$ time apart. In order to create L replicas of a signal with up to R possible replica-to-replica delay values, a total of N=LR fiber segments 20 and switches 18 are needed. Thus, in order to create 64 signal replicas with up to 128 possible replica-to-replica delay values, a total of 8,192 fiber segments 20 and switches 18 are needed. From a hardware point of view, prior art fiberoptic delay line 10 is very inefficient and impractical.

SUMMARY OF THE INVENTION

A fiberoptic delay line is provided which incorporates a cascaded binary fiberoptic segment delay line architecture. In a cascaded binary fiberoptic segment delay line (CBFDL), a signal to be delayed is routed via K cascaded switches through K fibers whose lengths are arranged so that the corresponding delays increase by a power of 2. Thus, the first fiber corresponds to a delay $T_1$, the second fiber to a delay $2T_1$, the third fiber to a delay $4T_1$ and the Kth fiber to a delay $2^{(K-1)}T_1$.

Each switch allows the signal to connect or bypass a specific fiber segment. The total number of possible delay combinations is equal to $2^K$. For example, with 5 fiber segments, 32 different delay combinations are possible.

In order to provide a fiberoptic delay line having variable replica-to-replica time resolution, a plurality of CBFDLs are connected. Each CBFDL in the delay line has K segments. However, each CBFDL has a different time resolution, in which the minimum time resolution for a particular CBFDL is twice that of the previous CBFDL. Where M CBFDLs are used in the fiber optic delay line, a total of $2^M$ replicas can be created.

DETAILED DESCRIPTION OF THE PREFERRED EMBODIMENTS

Figure 4:
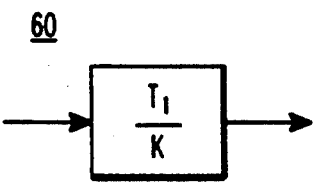
FIG. 4 is a schematic representation of a generic CBFDL having a minimum delay resolution $T_1$ and having K segments.
Figure 5:
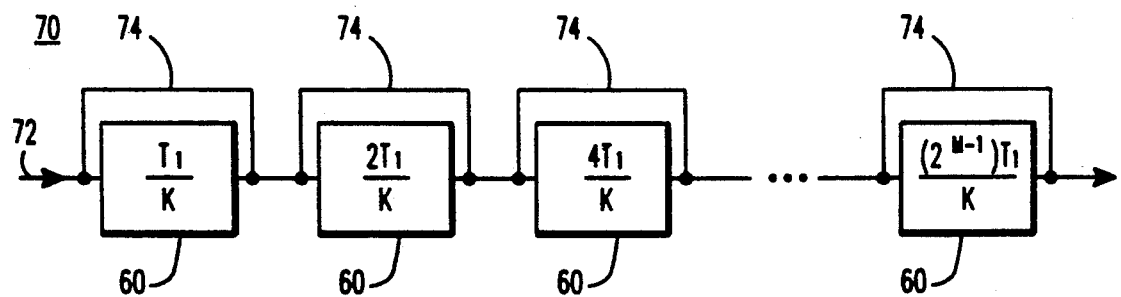
FIG. 5 is a schematic representation of the fiberoptic delay line for generating multiple replicas of a RF signal with variable replica-to-replica time resolution of the present invention utilizing M generic CBFDLs of FIG. 4.

A fiberoptic delay line 70 for generating multiple replicas of an RF signal with variable replica-to-replica time resolution is shown in FIG. 5. Fiberoptic delay line 70 utilizes M CBFDLs 60 shown generically in FIG. 4. Each CBFDL 60 has K segments. However, the time resolution among the M CBFDLs 60 varies, wherein the minimum time resolution of a particular CBFDL is twice that of the previous CBFDL. This is shown in FIG. 5 where the minimum delay time resolution of the first CBFDL is $T_1$, the minimum delay resolution of the second CBFDL is $2T_1$, the minimum delay resolution of the third CBFDL is $4T_1$ and the minimum delay resolution of the MTH CBFDL $2^{(M-1)}T_1$.

Figure 1:
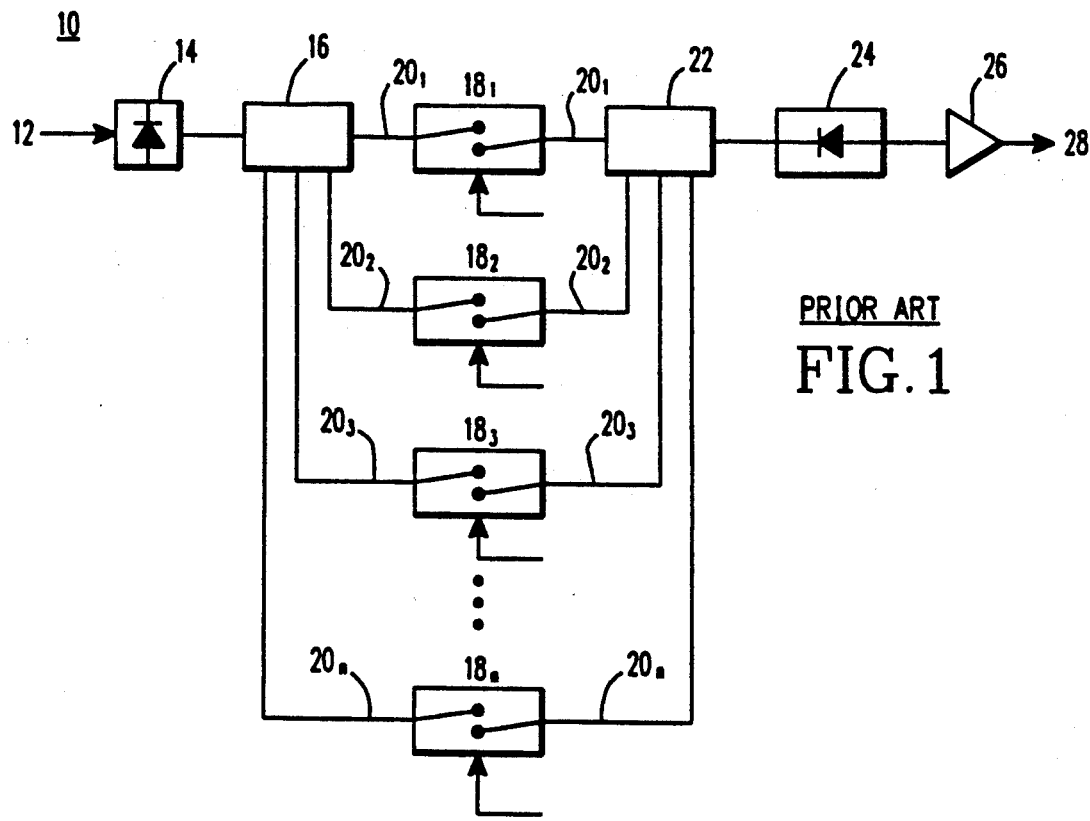
FIG. 1 a schematic representation of a fiberoptic delay line of the prior art.
Figure 2:
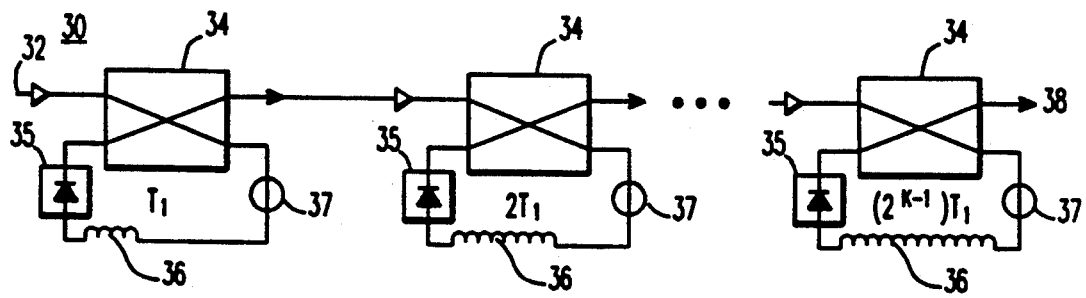
FIG. 2 is a schematic representation of a first presently preferred embodiment of a CBFDL used in the present invention.
Figure 3:
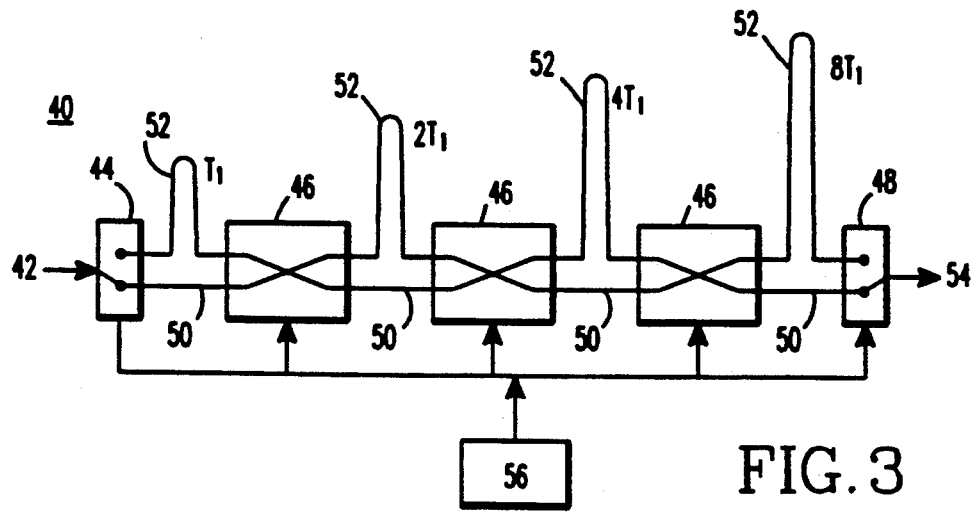
FIG. 3 is a schematic representation of a second presently preferred CBFDL used in the present invention.

Each CBFDL 60 can be implemented with either hybrid optoelectronic or solely optical techniques. FIG. 2 shows CBFDL 30 utilizing solely hybrid optoelectronic techniques. FIG. 3 shows CBFDL 40 utilizing optical techniques.

In the hybrid optoelectronic CBFDL 30, a total of K fiber segments 36 and K radio frequency single pull double throw switches 34 are used. Each switch 34 allows the signal to connect or bypass a specific fiber segment 36. The length of the fiber segments 36 are arranged so that the corresponding delays generated by those segments 36 increase by a power of 2. As shown in FIG. 2, the delay associated with the first fiber segment 36 is $T_1$, the delay associated with the second fiber segment 36 is $2T_1$ and the delay associated with the Kth fiber segment 36 is $2^{(K-1)}T_1$.

In each fiber segment 36, laser diode 35 and detector 37 are used for converting the input radio frequency signal 32 to an optical signal and vice versa. By utilizing K fiber segments 36 and switches 34, the total number of possible delay combinations in CBFDL 30 is equal to $2^K$.

The output signal 38 from hybrid optoelectronic CBFDL exits the last switch 34. Each switch 34 is controlled to provide the desired overall time delay resolution for CBFDL 30.

In the optical CBFDL 40, an input optical signal 42 drives a 1×2 switch 44, a series of 2×2 switches 46, and a final 1×2 switch 48. Bypass lines 50 are provided between each of the switches 44, 46 and 48 to provide a signal path having no delay. Time delay segments 52 are also provided between each of switches 44, 46 and 48. Time delay segments 52 are arranged so that the corresponding delays increase by a power of 2. In the example shown in FIG. 3, the delay for the first time delay segment 52 is $T_1$, the delay for the second time delay segment 52 is $2T_1$, the delay for the third time delay segment 52 is $4T_1$ and the delay for the fourth time delay segment 52 is $8T_1$. Like the hybrid optoelectronic CBFDL 30, optical CBFDL 40 is capable of generating $2^K$ possible delay combinations.

The output signal 54 from optical CBFDL 40 exits from 1×2 switch 48. Digital controller 56 is used to control each of switches 44, 46 and 48 so as to provide the desired overall time delay resolution for CBFDL 40.

As shown in FIG. 5, fiberoptic delay line 70 utilizes M CBFDLs 60. Each CBFDL 60 has K segments and varied minimum time resolution. The minimum time resolution of the first CBFDL 60 is $T_1$. The minimum time resolution of the second CBFDL 60 is $2T_1$. The minimum time resolution of the third CBFDL 60 is $4T_1$. The minimum time resolution of the Mth CBFDL 60 is $2^{(M-1)}T_1$.

For each CBFDL 60, the input signal is split into two, one part which drives CBFDL 60 and the other part 74 which bypasses CBFDL 60 and is added to its output. Thus, the output of the first CBFDL 60 consists of two signal replicas that are spaced at 0 and $iT_1$ time locations, with $iT_1$ being set by properly configuring the switches of CBFDL 60. That same switch configuration is applied to all CBFDLs 60 in delay line 70. Since each CBFDL 60 has K segments, there are $2^K$ possible different delays between the two replicas. These two replicas are then applied to the second CBFDL 60 whose switches conform to the configuration of the switches of the first CBFDL 60. Since the minimum time resolution of the second CBFDL 60 is $2T_1$, the delay introduced by the second CBFDL 60 is equal to $2iT_1$.

At the output of the second CBFDL 60, four replicas of the input signal 72 are present and are located at 0, $iT_1$, $2iT_1$, and $3iT_1$, respectively. The first two replicas are due to the propagation of the first CBFDL 60 signal output through bypass segments 74, whereas the second two replicas are due to the propagation of the first CBFDL 60 output signal through the second CBFDL 60. Thus, the second CBFDL 60 doubles the number of input replicas while it maintains the replica-to-replica delay which is set by the first CBFDL 60.

At the output of the third CBFDL 60, eight replicas spaced $iT_1$ apart are found. The first four replicas are due to the bypass segment 74 path propagation about the third CBFDL 60 and occupy a total time of $3iT_1$. The second four replicas are due to the delay path propagation introduced by the third CBFDL 60. This situation continues and every time data is entered to a subsequent CBFDL 60, the number of replicas doubles. However, the replica-to-replica time spacing is the same as that set at the first CBFDL 60.

In accordance with the architecture of fiberoptic segment delay line 70, a total of $2^M$ replicas can be produced from a total of M CBFDLs 60. This number is variable since one or more of the CBFDLs 60 can be bypassed if desired. The number of replica-to-replica delay values is determined by the number of fiber segments K present in each CBFDL 60. The minimum delay resolution is determined by $T_1$ which is the minimum delay resolution of the first CBFDL 60.

The advantage of the architecture of fiberoptic segment delay line 70 is best seen in a comparison with the fiberoptic delay line 10 of the prior art. Taking the same example discussed above, for a fiberoptic delay line having 64 replicas with up to 128 possible replica-to-replica delay values, a total of 6 CBFDLs 60 each having 7 fiber segments therein are required. This can be expressed arithmetically as:

$$N = (\log_2 R) \times (\log_2 L) = K \times M$$

where N is the number of fiber segments and switches, R is the number of replica-to-replica delay values and L is the number of replicas. Substituting 64 for L and 128 for R reveals that a total of 42 fiber segments and switches are needed in the architecture of the fiberoptic delay line 70. This compares favorably with the 8192 segments and switches needed with the prior art fiberoptic delay line 10.

In the foregoing specification certain preferred practices and embodiments of this invention have been set out, however, it will be understood that the invention may be otherwise embodied within the scope of the following claims.

We claim:

1. A signal processor for generating multiple replicas of a signal having variable replica-to-replica time resolution comprising:
   a. means for receiving said signal to be replicated;
   b. a plurality of serially connected cascaded binary fiberoptic segment delay lines, wherein (i) the first of said plurality of cascaded binary fiberoptic segment delay lines is connected to said signal receiving means, (ii) each of said plurality of cascaded binary fiberoptic segment delay lines has a different minimum delay time, and (iii) said plurality of cascaded binary fiberoptic segment delay lines create a plurality of replicated signals; and
   c. means for transmitting said plurality of replicated signals.

2. The signal processor of claim 1 wherein the minimum delay time for each of said plurality of cascaded binary fiberoptic segment delay lines is represented by $2^{(M-1)}T_1$ where M is the serial location of said cascaded binary fiberoptic segment delay line with respect to said receiving means and $T_1$ is the desired minimum delay time.

3. The signal processor claim 2 wherein the input signal to each of said plurality of cascaded binary fiberoptic segment delay lines is split in two wherein one of said split signals drives said cascaded fiberoptic segment delay line and the other said split signal is added to the output of said cascaded binary fiberoptic segment delay line.

4. The signal processor of claim 3 wherein the operation of each of said plurality of cascading binary fiberoptic segment delay lines is selectively controlled, thereby varying the time resolution of said replicated signals.

5. The signal processor of claim 4 wherein said plurality of cascaded binary fiberoptic segment delay lines are optical cascaded binary fiberoptic segment delay lines.

6. The signal processor claim 4 wherein said plurality of cascaded binary fiberoptic segment delay lines are hybrid optoelectronic cascaded binary fiberoptic segment delay lines.

7. A method for generating replicas of a signal with variable replica-to-replica time resolution comprising the steps of:
   a. receiving a signal to be replicated;
   b. transmitting said signal to be replicated to a plurality of serially connected cascaded binary fiberoptic segment delay lines, where each of said plurality of cascaded binary fiberoptic segment delay lines have a different minimum delay time;
   c. selectively controlling each of said plurality of cascaded binary fiberoptic segment delay lines to obtain the desired replication generated by said plurality of cascaded binary fiberoptic delay lines;
   d. processing said signal to be replicated in said plurality of cascaded binary fiberoptic delay lines to generate a plurality of replicated signals having replica-to-replica time resolution; and
   e. transmitting said plurality of replicated signals.

8. A signal processor for generating multiple replicas of a signal having variable replica-to-replica time resolution comprising:
   a. means for receiving said signal to be replicated;
   b. means for replicating said signal, said means for replicating having a plurality of means for generating a delayed signal, said plurality of means for generating a delayed signal being serially connected, each of said means for generating a delayed signal equipped with a bypass segment which does not impart a delay; and
   c. means for receiving said plurality of replicated signals and transmitting said plurality of replicated signals.

9. The signal processor of claim 8 wherein said means for generating a delayed signal comprises a cascaded binary fiberoptic segment delay line.

10. The signal processor of claim 8 wherein each of said plurality of means for generating a delayed signal has a varied minimum delay time represented by $2^{(M-1)}T_1$ wherein M is the serial location of said means for generating a delayed signal relative to said means for receiving and $T_1$ is the desired minimum delay time for the signal processor.

11. The signal processor of claim 10 wherein each of said plurality of means for generating a delayed signal comprises a cascaded binary fiberoptic segment delay line.

12. The signal processor of claim 11 wherein each of said cascaded binary fiberoptic segment delay lines is a hybrid optoelectronic cascaded binary fiberoptic segment delay line.

13. The signal processor of claim 11 wherein each of said cascaded binary fiberoptic segment delay lines is an optical cascaded binary fiberoptic segment delay line.

14. The signal processor of claim 8 wherein each of said plurality of means for generating a delay is selectively operated to vary the replica-to-replica time resolution of said signal processor.

* * * * *